US008965042B2

(12) United States Patent
Borger et al.

(10) Patent No.: US 8,965,042 B2
(45) Date of Patent: Feb. 24, 2015

(54) SYSTEM AND METHOD FOR THE MEASUREMENT OF RETAIL DISPLAY EFFECTIVENESS

(75) Inventors: Sergio Borger, Demarest, NJ (US); Christopher R. Carlson, Incline Village, NV (US); Arun Hampapur, Norwalk, CT (US); Andrew W. Senior, New York, NY (US); Chiao-Fe Shu, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1447 days.

(21) Appl. No.: 11/688,281

(22) Filed: Mar. 20, 2007

(65) Prior Publication Data

US 2008/0232641 A1 Sep. 25, 2008

(51) Int. Cl.
*G06K 9/00* (2006.01)
*G07F 9/02* (2006.01)
*G06Q 30/02* (2012.01)

(52) U.S. Cl.
CPC ............... *G07F 9/026* (2013.01); *G06Q 30/02* (2013.01)
USPC ........ 382/103; 382/100; 382/107; 705/14.41; 705/14.45; 705/14.52

(58) Field of Classification Search
USPC ............ 382/100, 103, 107; 705/14.41, 14.45, 705/14.52
See application file for complete search history.

(56) References Cited

U.S. PATENT DOCUMENTS

| | | | |
|---|---|---|---|
| 7,143,065 B1 * | 11/2006 | Enright | 705/43 |
| 7,685,021 B2 * | 3/2010 | Kumar et al. | 705/26.2 |
| 8,189,926 B2 * | 5/2012 | Sharma et al. | 382/224 |
| 8,289,390 B2 * | 10/2012 | Aggarwal et al. | 348/143 |
| 2002/0178085 A1 * | 11/2002 | Sorensen | 705/26 |
| 2003/0088832 A1 * | 5/2003 | Agostinelli et al. | 715/526 |
| 2004/0111454 A1 * | 6/2004 | Sorensen | 708/200 |
| 2005/0078178 A1 * | 4/2005 | Brown et al. | 348/139 |
| 2005/0080671 A1 * | 4/2005 | Giraud et al. | 705/14 |
| 2005/0156031 A1 | 7/2005 | Goel et al. | |
| 2006/0010028 A1 * | 1/2006 | Sorensen | 705/10 |
| 2006/0010030 A1 * | 1/2006 | Sorensen | 705/10 |
| 2006/0078047 A1 * | 4/2006 | Shu et al. | 375/240.01 |
| 2006/0159308 A1 | 7/2006 | Hampapur et al. | |
| 2006/0197839 A1 | 9/2006 | Senior et al. | |

(Continued)

FOREIGN PATENT DOCUMENTS

WO WO 2006060889 A1 * 6/2006 ............. G06F 17/60

OTHER PUBLICATIONS

Hampapur et al., "Smart Serveillance: Applications, Technologies and Implications", pp. 1-6.

(Continued)

*Primary Examiner* — Matthew Bella
*Assistant Examiner* — Julian Brooks
(74) *Attorney, Agent, or Firm* — Matthew Chung; Hoffman Warnick LLC

(57) ABSTRACT

The present invention relates to the measurement of human activities through video, particularly in retail environments. A method for measuring retail display effectiveness in accordance with an embodiment of the present invention includes: detecting a moving object in a field of view of an imaging device, the imaging device obtaining image data of a product display; tracking the object in the field of view of the imaging device to obtain a track; and obtaining statistics for the track with regard to the product display.

18 Claims, 4 Drawing Sheets

(56) References Cited

U.S. PATENT DOCUMENTS

2006/0243797 A1    11/2006  Apte et al.
2006/0256133 A1*   11/2006  Rosenberg .................... 345/619
2007/0127692 A1*    6/2007  Varadarajan et al. .... 379/265.06
2008/0172261 A1*    7/2008  Albertson et al. ................ 705/7
2008/0294487 A1*   11/2008  Nasser .............................. 705/8
2012/0321146 A1*   12/2012  Kundu et al. ................. 382/118

OTHER PUBLICATIONS

Hampapur et al., "The IBM Smart Surveillance System", pp. 1-6, IEEE 2004.
Brown et al., "IBM Smart Surveillance System (S3): An Open and Extensible Architecture for Smart Video Surveillance," 2005, 4 pages, retrieved from: http://nguyendangbinh.org/Proceedings/ICCV/2005/Demos/IBM_S3/IBMS3_ICCV05Demo.PDF.

* cited by examiner

SYSTEM AND METHOD FOR THE MEASUREMENT OF RETAIL DISPLAY EFFECTIVENESS

FIELD OF THE INVENTION

The present invention relates to the field of video camera systems. More particularly, the present invention relates to the measurement of human activities through video, particularly in retail environments.

BACKGROUND OF THE INVENTION

In a retail store it is desirable to be able to measure the effectiveness of a product display or to measure the attractiveness of a product. Being able to measure these attributes can help with store layout planning, for instance to optimize the placement of displays such that they maximize revenue or margin. Similarly, these attributes can help with the design of the displays or products themselves by maximizing attractiveness.

SUMMARY OF THE INVENTION

The present invention relates to the measurement of human activities through video, particularly in retail environments. In an embodiment, the present invention discloses the calculation of display effectiveness based on relative counts of people passing by a display, stopping at the display, and interacting with the display, based upon a view of the display captured by a video camera. A tracking system is used to determine and analyze the activity captured by the video camera.

A first aspect of the present invention is directed to a method for measuring retail display effectiveness, comprising: detecting a moving object in a field of view of an imaging device, the imaging device obtaining image data of a product display; tracking the object in the field of view of the imaging device to obtain a track; and obtaining statistics for the track with regard to the product display.

A second aspect of the present invention is directed to a system for measuring retail display effectiveness, comprising: an imaging device for obtaining image data of a product display; a system for detecting a moving object in a field of view of the imaging device; a system for tracking the object in the field of view of the imaging device to obtain a track; and a system for obtaining statistics for the track with regard to the product display.

A third aspect of the present invention is directed to a program product stored on a tangible computer readable medium, which when executed, measures retail display effectiveness, the computer readable medium comprising program code for: detecting a moving object in a field of view of an imaging device, the imaging device obtaining image data of a product display; tracking the object in the field of view of the imaging device to obtain a track; and obtaining statistics for the track with regard to the product display.

A fourth aspect of the present invention is directed to a method for deploying an application for measuring retail display effectiveness, comprising: providing a computer infrastructure being operable to: detect a moving object in a field of view of an imaging device, the imaging device obtaining image data of a product display; track the object in the field of view of the imaging device to obtain a track; and obtain statistics for the track with regard to the product display.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
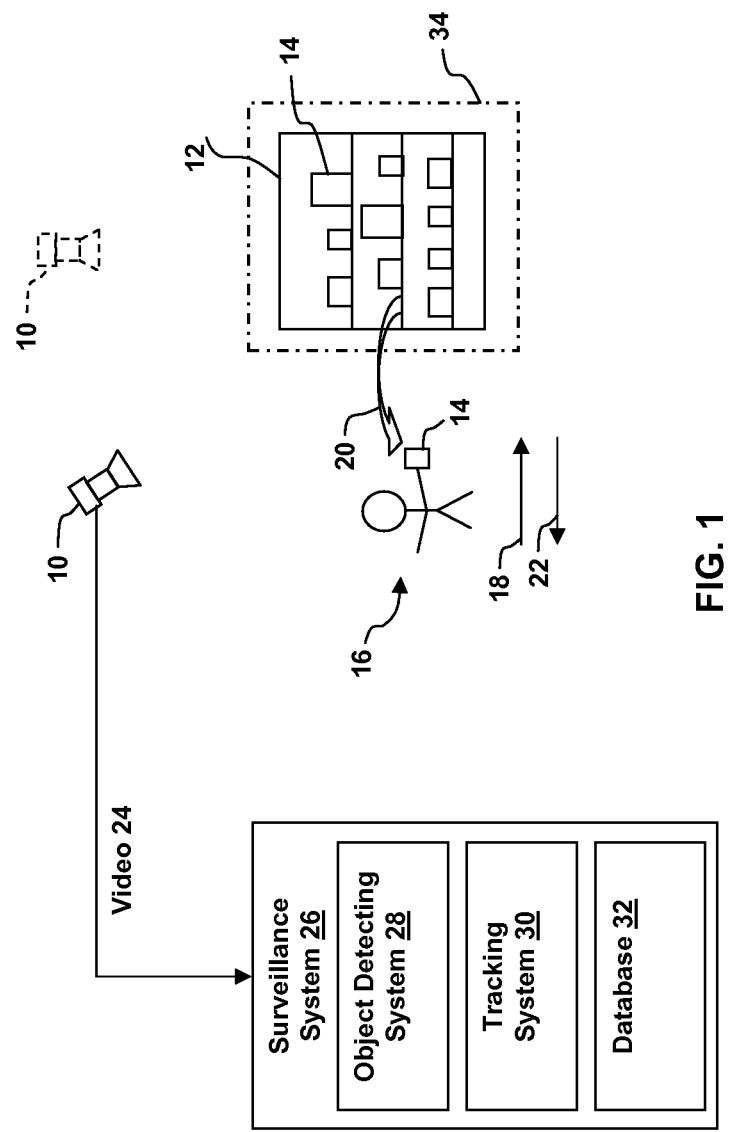
FIG. 1 is an illustrative system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention relates to the measurement of human activities through video, particularly in retail environments.

The retail industry endeavors to maximize returns by optimizing store layout and display appearances. A store may have rich information regarding the quantity of sales from Point of Sales (POS) transaction logs (TLOGs) that record every item sold (e.g., the time of sale, the customer's discount, the co-occurrence of the item with other items in a shopping basket, etc.). Conventionally, however, only crude measures of the effectiveness of design changes are available.

Changing a display appearance or position may result in measurable differences in a product's sales, but it is clear that other factors can affect those sales. For instance, if some nearby event brings additional customers into the store, then additional sales may result. Even within a store, a nearby promotion may attract more people past a display or distract the attention of customers from the display in question. Thus, it is desirable to measure not just sales, or even sales per customer visiting the store, but also sales per customer who reaches the product in the store, or even sales per customer who sees the product, or actually picks it up. The effectiveness of changes in a product's packaging can thus be measured (e.g., of customers who saw this product 20% more picked it up when in the blue packaging; of customers who picked up the product 20% more bought the low-trans-fat version than the original, etc.).

The number of people entering the store can be measured by a variety of means, including video person-tracking systems. In accordance with embodiment(s) of the present invention, video tracking technology is employed to track people within a store and to understand their actions.

In an embodiment of the present invention, retail display effectiveness is implemented at a camera level. For example, as shown in FIG. 1, an imaging device (e.g., video camera 10) is pointed at a display 12 of products 14 so as to cover customers 16 approaching 18, interacting with 20, and leaving 22 the display 12. Good results can be obtained by having an overhead camera view as depicted in FIG. 1, or even looking vertically down at the display as depicted in phantom. Other locations/orientations of the video camera are also possible.

The video 24 provided by the video camera 10 is supplied to an automatic surveillance system 26. One such automatic surveillance system is known as the "Smart Surveillance System" and is described in A. Hampapur, L. Brown, J. Connell, S. Pankanti, A. W. Senior, and Y.-L. Tian, Smart Surveillance: Applications, Technologies and Implications, IEEE Pacific-Rim Conference on Multimedia, Singapore, December 2003, which is incorporated herein by reference in its entirety. In accordance with an embodiment of the present invention, the surveillance system 26 includes an object detecting system 28 for detecting moving objects (e.g., customers 16) in the field of view of the video camera 10, a tracking system 30 for tracking those objects, and a database (DB) 32 for storing data provided/used by the surveillance system 26. Preferably, the tracking system 30 is capable of distinguishing and separately tracking a plurality of different objects.

The tracking system 30 is configured to track each customer 16 within the field of view of the video camera 10. Further, the tracking system 30 is configured to count the number of customers 16 in the area of the retail establishment in which the display 12 is located, and to determine the amount of time each customer 16 is located within the field of view of the video camera 10 or within one or more particular "Regions of Interest" (ROIs) within the field of view of the video camera 10, as presented in greater detail below. The count of customers 16 provided by the tracking system 30 can be compared to the number of customers 16 entering the retail establishment and/or a particular section of the retail establishment. The number of customers 16 entering the retail establishment and/or a section thereof can be determined using any now known or later developed technology (e.g., electronic beam). Further, the count of customers 16 provided by the tracking system 30 can also be compared to the sales from products 14 located in the area of the retail establishment containing the display 12 and being monitored by the video camera 10.

As stated above, more precise counts or other figures of interest can be derived by designating a "Region of Interest" (ROI) within the field of view of the video camera 10 and counting the number of people who pass through that ROI. As depicted in FIG. 1, an illustrative ROI 34 can comprise, for instance, the area immediately in front of the display 12. A count of the number of customers 16 passing in front of the display 12 can be provided using the ROI 34.

In an embodiment, a graphical user interface (GUI) is provided that allows the drawing and redrawing of ROIs to provide the desired counts, for one or more ROIs in the field of view of any given video camera. Counts can be evaluated by querying a database (e.g., DB 32, FIG. 1) that is continuously updated by the surveillance system with data regarding the tracked customers passing through the field of view of a video camera. "Passing through" an ROI can be defined in a number of ways, including but not limited to: the centroid of the tracked customer entering the ROI, any other designated or defined point on the tracked customer entering the ROI (e.g., head, hand, foot, face, etc.), all the pixels (or some fraction, predetermined or calculated dynamically) of the tracked customer being within the ROI, etc.

Figure 2:
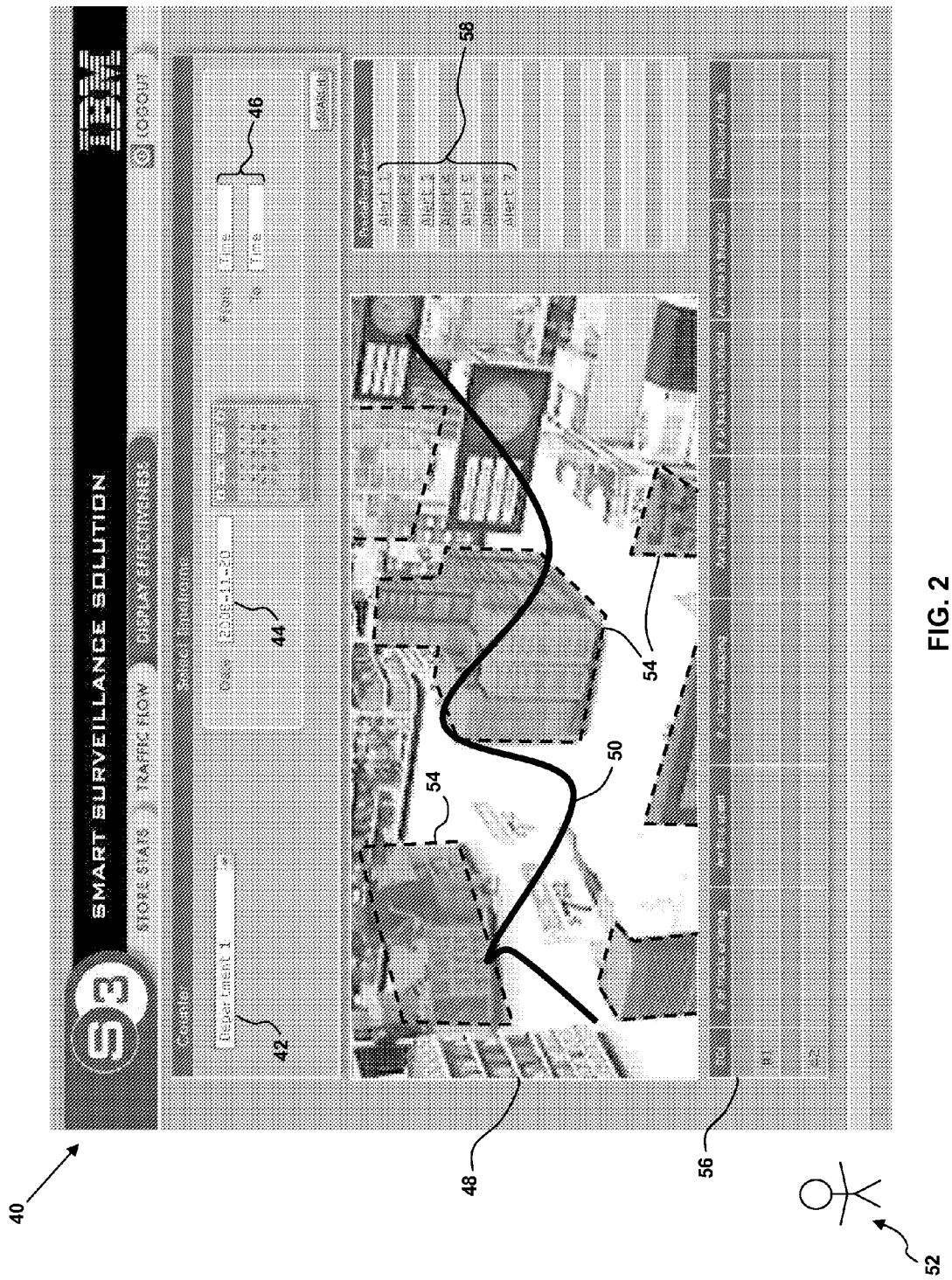
FIG. 2 is an illustrative graphical user interface (GUI) in accordance with an embodiment of the present invention.

An illustrative GUI 40 (e.g., for a web-based application running in a web browser) in accordance with an embodiment of the present invention is depicted in FIG. 2. The GUI 40 comprises a drop down menu 42 for selecting a video camera, an entry box/calendar widget 44 for specifying a date, an entry box 46 for specifying a time interval, and a window 48 for displaying the view of the selected video camera and one or more customer tracks 50. Other suitable mechanisms for selecting/setting the various attributes of the GUI 40 can also be employed.

A user 52 can draw/select/specify/define one or more ROIs 54 in the window 48, which may be intersected by zero or more tracks 50, using any now known or later developed technique. For example, the user 52 can use a pointing device (e.g., mouse) and drawing tool to define each ROI 54 in the window 48. Many other techniques are also possible. In FIG. 2, each ROI 54 in the window 48 is highlighted in phantom.

The GUI 40 also includes a table 56 for the display of track statistics for the specified video camera, date, and time interval, for one or more selected ROIs 54. This data can be stored, for example, in the DB 32 (FIG. 1). Examples of the types of statistics that can be displayed for a given ROI 54 include:

(A) Number of tracks entering the ROI;
(B) Average time spent within the ROI;
(C) Number of tracks stopping in the ROI;
(D) Average time stopped in the ROI;
(E) Number of tracks spending longer than a threshold time in the ROI;
(F) Average time spent in ROI of tracks that spend longer than a threshold time in the ROI; and
(G) Statistics relating to predefined alerts.

The user 52 can select one or more predefined alerts 58 (e.g., via a hyperlink). Each alert 58 corresponds to a particular condition (e.g., a reach action, a product holding/examining action, etc.) triggered by one or more of the tracks 50.

Figure 3:
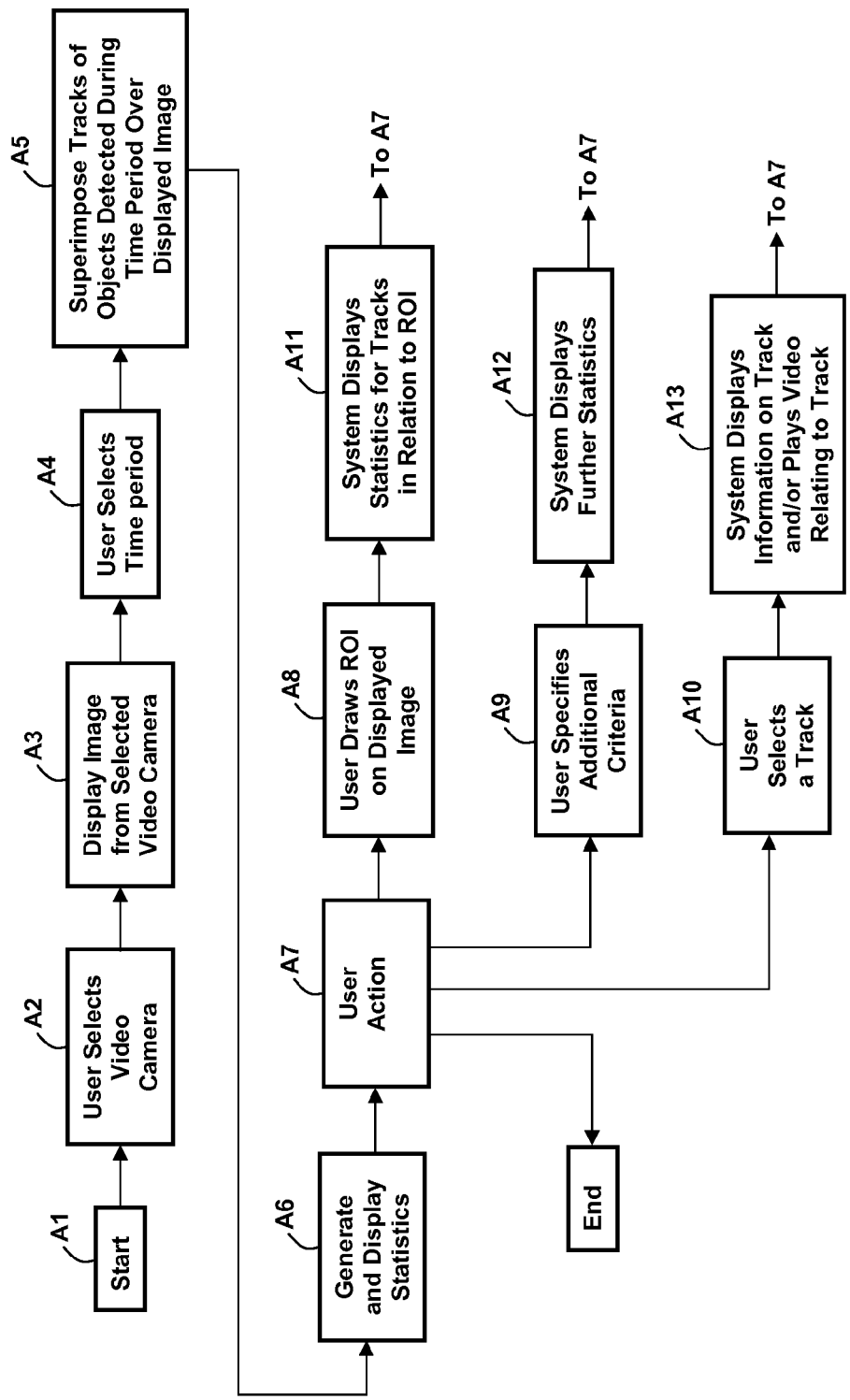
FIG. 3 is an illustrative flow diagram of an operational process in accordance with an embodiment of the present invention.

FIG. 3 depicts an operational flow diagram of an embodiment of the present invention. In this embodiment, a user begins (A1) by selecting (A2) a video camera. The system then displays (A3) a sample image (or live video) from the chosen video camera. The user also selects (A4) a time period, for instance by choosing a date by clicking on a calendar widget, and using graphical sliders to select begin and end times. After the user has selected the time period, the system draws and superimposes (A5) on the displayed image the tracks of the objects (e.g., customers) that were detected by the video camera during the selected time period. The system then generates and displays (A6) statistics associated with the tracks of the objects. The user can then select (A7) an action.

Examples of actions that can be selected by the user include, but are not limited to:

(A) Drawing (A8) an ROI on the displayed image view (e.g., using a polygon, rectangle or other drawing tool);
(B) Specifying (A9) additional criteria; and
(C) Selecting (A10) a particular track.

If the user selects to draw (A8) an ROI on the displayed image, the system responds by calculating and displaying (A11) statistics related to the ROI, such as counting the number of tracks that pass through the ROI (and highlighting those tracks in the graphical display), calculating the average speed of these tracks, calculating the average time each track spent within the ROI, etc. Alternatively a user might specify (A9) additional criteria, such as an action that the tracked object carried out (stopping, touching merchandise, triggering a visual alert, etc.), or some appearance specification (colored red, larger then 5000 pixels etc.). This can also trigger the display (A12) of counts and statistics related to the subselection of tracks. If the user uses the GUI to select (A10) a particular track (e.g., by clicking with a mouse button or just moving the mouse cursor over the track), the system can respond by displaying (A13) particular information about that track (a thumbnail, its duration, speed, length, etc.) and/or by playing the video associated with the track.

Figure 4:
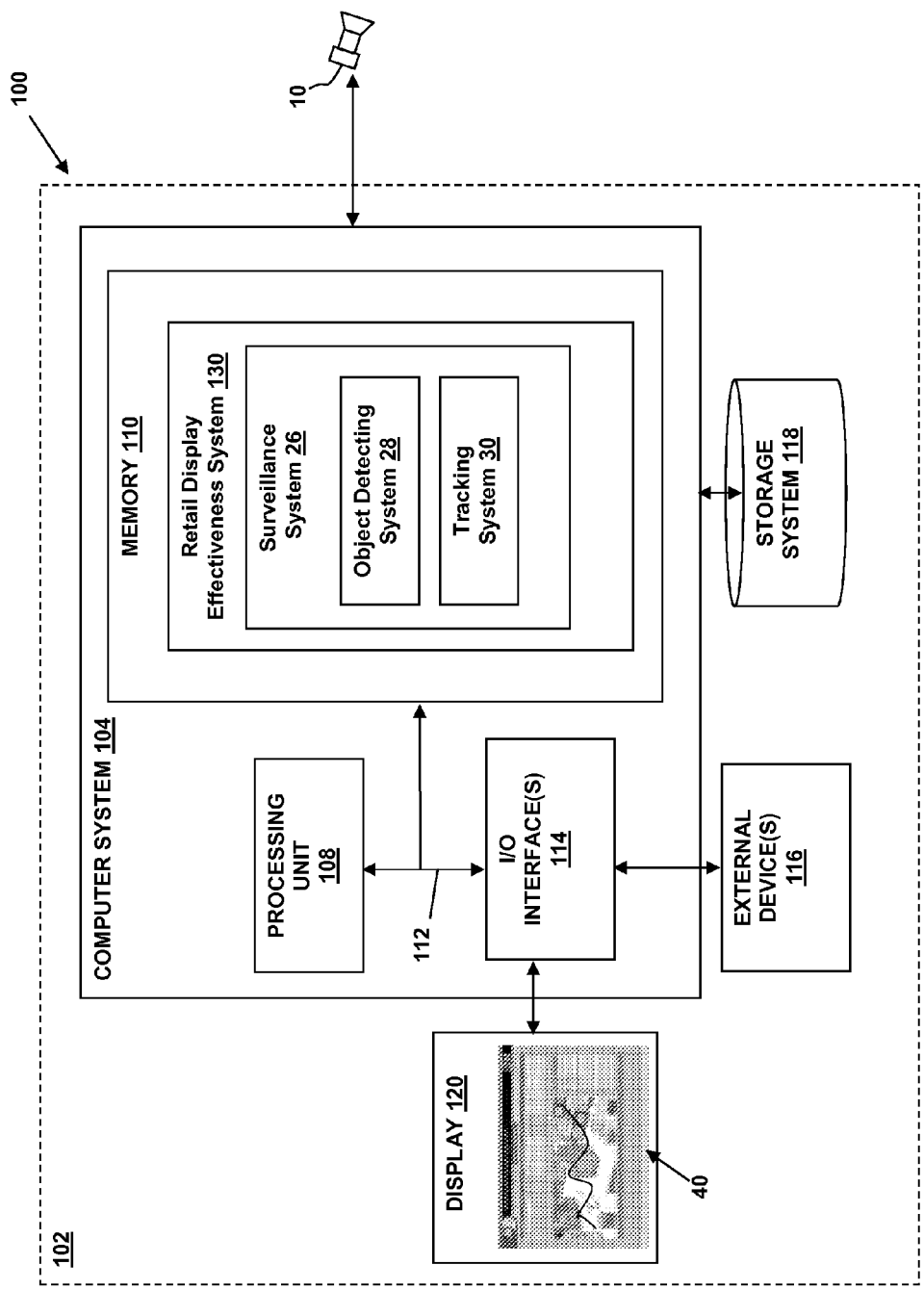
FIG. 4 depicts an illustrative computer system for implementing embodiment(s) of the present invention.

FIG. 4 depicts an illustrative system 100 for carrying out and/or implementing a retail display effectiveness system 130 in accordance with any/all embodiments of the present invention. The system 100 includes a computer infrastructure 102 that can perform the various processes described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as the retail display effectiveness system 130, that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user to interact with the computer system 104 or any device that enables the computer system 104 to communicate with one or more other computer systems.

The retail display effectiveness system 130 includes various systems for implementing any/all embodiments of the of the present invention. For example, the retail display effectiveness system 130 can include a video camera 10 and a surveillance system 26. The surveillance system 26 can comprise an object detecting system 28 and a tracking system 30. The operations carried out by each of these systems is described in greater detail above.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in an embodiment, the computer infrastructure 102 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 4 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a computer infrastructure, such as the computer infrastructure 102, that performs the processes of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

The invention claimed is:

1. A method for measuring retail display effectiveness, comprising:
    recording, using a single video imaging device, a set of moving objects in a field of view of the single video imaging device, the single video imaging device being directed at a product display for obtaining image data of the product display, the product display having at least one product in a store having at least one product that is outside the product display, the field of view being limited to a portion of the store that is not an entirety of the store;

specifying, by a user via a graphical user interface (GUI), the single video imaging device;

selecting, by the user via the GUI, a time period within the recording on the single video imaging device, wherein the time period includes a date and a time interval;

defining, by the user via the GUI, a plurality of regions of interest (ROIs), wherein the defining includes:

drawing the ROIs in the image data of the single video imaging device using a drawing tool according to the time period, wherein the drawing tool provides a drawing and redrawing function, selecting a definition of passing through one of the plurality of ROIs, the definition including at least one user selected pixel of a customer entering the ROI, wherein each customer passing through the ROI increases a count of customers entering the corresponding ROI, selecting a particular condition, wherein the particular condition comprises the customer passing through at least one of the ROIs and the customer performing at least one of a reach action, a touching merchandise action, a product holding action, and an examining action, and selecting a predefined alert, wherein the predefined alert is associated with at least one user-selected ROI of the plurality of ROIs and the predefined alert is triggered in response to the particular condition being satisfied;

tracking, using a computer device, the set of moving objects in the field of view of the imaging device using video image tracking to obtain a track in relation to the product display during the selected time period;

obtaining statistics for the track, wherein the statistics include:

a comparison for the track between sales of a first item of the product display and a second item of the product display per number of predefined alerts triggered within at least one of the ROIs, with regard to the first and second items of the product display, and wherein the first item of the product display includes an appearance specification different from the second item of the product display, a comparison of the count of customers entering at least one of the plurality of ROIs to a count of the predefined alerts triggered within the at least one user-selected ROI, wherein the count of each customer entering at least one of the plurality of ROIs and the count of each predefined alerts triggered within the at least one user-selected ROI are obtained only from the image data of the single video imaging device; and displaying, via the GUI, a table that shows the statistics for the single video imaging device, the date, and the time interval for each of the plurality of ROIs, wherein the statistics are displayed in response to the particular condition for the predefined alert being satisfied or upon a request from the user.

2. The method of claim 1, wherein the tracking further comprises at least one of:

tracking the set of moving objects approaching the product display;

tracking the set of moving objects interacting with the product display; and tracking the set of moving objects leaving the product display.

3. The method of claim 1, further comprising:
positioning the imaging device in a relatively vertical position with regard to the ROI.

4. The method of claim 3, further comprising:
tracking a moving object in the ROI to provide a track; and
obtaining statistics for the track in the ROI with regard to the product display.

5. The method of claim 1, further comprising:
detecting and tracking a plurality of moving objects in the field of view of the imaging device; and
obtaining statistics for each track with regard to the product display.

6. The method of claim 5, wherein obtaining statistics further comprises
determining an amount of time each object remains in the field of view of the imaging device.

7. The method of claim 1, wherein the appearance specification includes a packaging of the first and second items of the product display.

8. The method of claim 1, wherein the tracking of the set of moving objects in the field of view of the imaging device further includes determining whether one of a head, hand, foot, and face enters the ROI.

9. The method of claim 1, wherein the image data includes live video.

10. A system for measuring retail display effectiveness, comprising:

a single video imaging device being directed at a product display for obtaining a recording of image data of the product display in a field of view of the single video imaging device, the product display having at least one set of products in a store having at least one set of products that is outside the product display, the field of view being limited to a portion of the store that is not an entirety of the store;

a system for detecting an object in the field of view of the single video imaging device during a selected time period using video image detection;

a system for tracking the object in the field of view of the imaging device to obtain a track in relation to the product display during the selected time period using video image tracking;

a system for obtaining statistics for the track, wherein the statistics include:

a comparison for the track between sales of a first item and a second item of the product display per a number of predefined alerts triggered within a plurality of regions of interest (ROIs), with regard to the first and second items of the product display, and wherein the first item of the product display includes an appearance specification different from the second item of the product display, a comparison of a count of each customer entering at least one of the ROIs to a count of the predefined alerts triggered within at least one user-selected ROI, wherein the count of each customer entering at least one of the ROIs and the count of the predefined alerts triggered within the at least one user-selected ROI are obtained only from the image data of a single video imaging device; and a graphical user interface (GUI) that enables a user to:
specify the single video imaging device;
select the time period within the recording on the single video imaging device, wherein the time period includes a date and a time interval, and define one of the plurality of ROIs that includes the product display by drawing the ROI in the image data of the single video imaging device using a drawing tool according to the time period, wherein the drawing tool provides a drawing and redrawing function, select a definition of passing through one of the plurality of ROIs, the definition including at least one user selected pixel of a customer entering the ROI, wherein each customer passing through the ROI increases the count of each customer entering at least one of the plurality of ROIs, select a particular condition, wherein the particular condition comprises the customer passing through at least one of the ROIs and the customer performing at least one of a reach action, a touching merchandise action, and a product holding action, select the predefined alert, wherein the predefined alert is associated within the at least one user-selected ROI of the plurality of ROIs and is triggered in response to the particular condition being satisfied; and display a table that shows the statistics for the single video imaging device, the date, and the time interval for each of the plurality of ROIs, wherein the statistics are displayed in response to the particular condition for the predefined alert being satisfied or upon a request from the user.

11. The system of claim 10, wherein the system for tracking is further configured to perform at least one of:
tracking the set of moving objects approaching the product display;
tracking the set of moving objects interacting with the product display; and
tracking the set of moving objects leaving the product display.

12. The system of claim 10, further comprising:
a system for positioning the imaging device in a relatively vertical position with regard to the ROI.

13. The system of claim 12, further comprising:
a system for tracking a moving object in the ROI to provide a track; and
a system for obtaining statistics for the track in the ROI with regard to the product display.

14. The system of claim 10, further comprising:
a system for detecting and tracking a plurality of moving objects in the field of view of the imaging device; and
a system for obtaining statistics for each track with regard to the product display.

15. The system of claim 14, wherein the system for obtaining statistics further comprises
a system for determining an amount of time each object remains in the field of view of the imaging device.

16. The method of claim 10, wherein the image data includes live video.

17. A program product stored on a tangible computer readable storage device, which when executed, measures retail display effectiveness, the computer readable medium comprising program code for:
recording, using a single video imaging device, a set of moving objects in a field of view of the single video imaging device, the single video imaging device being directed at a product display for obtaining image data of the product display, the product display having at least one set of products in a store having at least one set of products that is outside the product display, the field of view being limited to a portion of the store that is not an entirety of the store;

specifying, by a user via a graphical user interface (GUI), the single video imaging device;

selecting, by the user via the GUI, a time period within the recording on the single video imaging device, wherein the time period includes a date and a time interval;

defining, by the user via the GUI, a plurality of regions of interest (ROIs) wherein the defining includes:
drawing the ROI in the image data of the single video imaging device using a drawing tool according to the time period, wherein the drawing tool provides a drawing and redrawing function selecting a definition of passing through one of the plurality of ROIs, the definition including at least one user selected pixel of a customer entering at least one of the plurality of ROIs, wherein each customer passing through the ROI increases a count of each customer entering at least one of the ROIs, selecting a particular condition that triggers a predefined alert, wherein the particular condition comprises the customer passing through at least one of the ROIs and the customer performing at least one of a reach action, a touching merchandise action, a product holding action, and an examining action, and selecting the predefined alert, wherein the predefined alert is associated with at least one user-selected ROI of the plurality of ROIs;

tracking the set of moving objects in the field of view of the imaging device using video image tracking to obtain a track in relation to the product display during the selected time period;

obtaining statistics for the track, wherein the obtained statistics include:
a comparison between sales of a first and second item of the product display per number of the predefined alerts triggered within at least one of the ROIs with regard to the first and second items of the product display, and wherein the first item of the product display includes an appearance specification different from the second item of the product display with regard to the product display, a comparison of the count of each customer entering at least one of the ROIs to a count of the predefined alerts triggered within the at least one user-selected ROI, wherein the count of each customer entering at least one of the ROIs and the count of each predefined alerts triggered within the at least one user-selected ROI are obtained only from the image data of the single video imaging device; and displaying, via the GUI, a table that shows the statistics for the single video imaging device, the date, and the time interval for each of the plurality of ROIs wherein the statistics are displayed in response to the particular condition for the predefined alert being satisfied or upon a request from the user.

18. A method for deploying an application for measuring retail display effectiveness, comprising:
providing a computer infrastructure that operates to:
detect a plurality of moving objects in a field of view of a single video imaging device, the single video imaging device being directed at a product display for obtaining image data of the product display, the product display having at least one product in a store having at least one product that is outside the product display, the field of view being limited to a portion of the store that is not an entirety of the store;

specify, by a user via a graphical user interface (GUI), the single video imaging device;

select, by the user via the GUI, a time period within the recording on the single video imaging device, wherein the time period includes a date and a time interval;

define, by the user via the GUI, a plurality of regions of interest (ROIs) by performing actions including:
- drawing at least one ROI in the image data of the single video imaging device using a drawing tool according to the time period, wherein the drawing tool provides a drawing and redrawing function,
- selecting a definition of passing through one of the plurality of ROIs, the definition including at least one user selected pixel of a customer entering the ROI, wherein each customer passing through the ROI increases a count of each customer entering at least one of the plurality of ROIs,
- selecting a particular condition, wherein the particular condition comprises the customer passing through the ROI and the customer performing at least one of a reach action, a touching merchandise action, a product holding action, and an examining action, and
- selecting a predefined alert, wherein the predefined alert is associated with at least one user-selected ROI of the plurality of ROIs, wherein the predefined alert is triggered in response to the particular condition being satisfied;

track the plurality of moving objects in the field of view of the imaging device using video image tracking to obtain a track in relation to the product display during the selected time period;

obtain statistics for the track, wherein the statistics include a comparison between sales of a first item of the product display and a second item of the product display per number of the predefined alerts triggered within at least one of the ROIs, with regard to the first and second items of the product display, and wherein the first item of the product display includes an appearance specification different from the second item of the product display; and compare the count of each customer entering at least one the plurality of ROIs to a count of the predefined alerts triggered within the at least one user-selected ROI, wherein the count of each customer entering at least one of the plurality of ROIs and the count of the predefined alerts triggered within the at least one user-selected ROI are obtained only from the image data of the single video imaging device; and display, via the GUI, a table that shows the statistics for the specified video imaging device, the date, and the time interval for each ROIs, wherein the statistics are displayed in response to the particular condition for the predefined alert being satisfied or upon a request from the user.

* * * * *